United States Patent [19]

Zyokou et al.

[11] Patent Number: 4,963,707
[45] Date of Patent: Oct. 16, 1990

[54] RESISTANCE WELDING CONTROL SYSTEM

[75] Inventors: Keizou Zyokou, Okazaki; Shinzo Ito, Aichi; Tsuyoshi Sugiyama, Anjo, all of Japan

[73] Assignee: Nippondenso Co., Ltd., Kariya, Japan

[21] Appl. No.: 375,778

[22] Filed: Jul. 5, 1989

[30] Foreign Application Priority Data

Jul. 6, 1988 [JP] Japan .................. 63-168545

[51] Int. Cl.$^5$ .............................................. B23K 11/24
[52] U.S. Cl. ..................................... 219/110; 219/114
[58] Field of Search ................................. 219/110, 114

[56] References Cited

U.S. PATENT DOCUMENTS

| | | | |
|---|---|---|---|
| 4,302,653 | 11/1981 | Denning et al. | 219/110 |
| 4,634,828 | 1/1987 | Okabe et al. | 219/110 |
| 4,675,494 | 6/1987 | Dilay . | |
| 4,700,042 | 10/1987 | Ferrero et al. . | |

FOREIGN PATENT DOCUMENTS

| | | |
|---|---|---|
| 57-1582 | 1/1982 | Japan . |
| 57-109581 | 7/1982 | Japan . |
| 58-23580 | 2/1983 | Japan . |
| 58-65583 | 4/1983 | Japan . |

Primary Examiner—Clifford C. Shaw
Attorney, Agent, or Firm—Cushman, Darby & Cushman

[57] ABSTRACT

A resistance welding control system is disclosed which comprises a resistance detection unit for detecting an interelectrode resistance by measuring welding current and voltage applied between electrodes; a compensation section for comparing a resistance value as detected with a predetermined model resistance value and determining an amount of compensation of the welding current in accordance with the difference therebetween; and a current control section for controlling the welding current on the basis of the amount of compensation of the compensation section.

12 Claims, 8 Drawing Sheets

RESISTANCE WELDING CONTROL SYSTEM

BACKGROUND OF THE INVENTION

The present invention relates to a resistance welding control system for securing a sound joint condition in the resistance welding process.

Generally, a study of the behavior of an interelectrode resistance R i.e. the resistance between two electrodes for securing a sound joint condition in the resistance welding process shows that the interelectrode resistance R assumes a waveform having a peak value (See FIG. 12) about when a nugget (molten part) begins to form at the joint after the temperature thereof reaches a level higher than the melting point of the base metal.

It is thus possible to secure a proper nugget area for producing a satisfactory joint condition at a peak value of the interelectrode resistance which is equal to a maximum resistance value Rmp less a resistance drop $\Delta R$.

In view of this, unlike in the conventional control systems in which the welding conditions including the welding current and energization time are fixed in open loop control, there have recently been suggested control systems aimed at securing a sound welding quality by stopping the energization at a resistance drop of $\Delta R$ from a maximum resistance value Rmp in accordance with the waveform of the above-mentioned interelectrode resistance R. (See, for example, Japanese Patent Publication No. JP-A-57-109581).

In the aforementioned art of stopping energization with a resistance drop of $\Delta R$ from the interelectrode resistance R, the temperature rise of the joint varies due to a change in the surface conditions of the base metal or the electrode conditions so that the time at which the resistance drop value $\Delta R$ appears undesirably changes.

The result is a variation in energization time. If the value $\Delta R$ is reached within a short time, for instance, a welding fault such as a welding spark would be generated, while if it takes a considerable time before $\Delta R$ is reached, on the other hand, the recess of the weld zone grows to such an extent that the welding strength would be deteriorated, thus making it impossible to secure a satisfactory joint condition in steady fashion.

SUMMARY OF THE INVENTION

The object of the present invention, which has been developed in view of the above-mentioned situation, is to provide a resistance welding control system in which a reliable welding quality is obtained by securing a sound joint condition in stable manner.

In order to achieve the above-mentioned object, there is provided according to the present invention a resistance welding control system comprising resistance detection means for detecting the interelectrode resistance by measuring the welding current and the voltage applied between electrodes, compensation means for comparing a detection resistance value detected by the resistance detection means with a model resistance value set in advance and determining a compensation amount of the welding current in accordance with the difference between the detection resistance value and the model resistance value, and current control means for controlling the welding current in accordance with the compensation amount of the compensation means.

According to another aspect of the invention, in the case where the detection resistance value is lower than the model resistance value, the welding current is preferably increased at a rate lower than the rate at which the welding current would be reduced if the detection resistance value is higher than the model resistance value.

According to still another aspect of the invention, the detection resistance value for the first cycle is rendered to coincide with a predetermined cycle of a model resistance value approximate to the resistance value, after which an amount of compensation of the welding current is determined by compensation means.

According to a further aspect of the invention, when the ratio Rec/Rea between Rec which is a resistance lower by a predetermined value than a peak value and Rea from an initial value to the peak value reaches a first proper level Rmc/Rma, the welding current is stopped.

According to still further aspect of the present invention, when the detection resistance value is decreased by a first predetermined value from a substantial peak value of the detection resistance value, the welding current is reduced by a predetermined amount.

The control system according to the present invention feeds back a detection resistance value detected by resistance detection means and compares it with a model resistance value set in advance. Subsequently, in accordance with the difference between the detection resistance value and the model resistance value, a compensation amount of the welding current is determined, and the welding current is controlled by feed back in such a manner that the detection resistance value follows the model resistance value.

As a result, when the plate thickness or the electrodes undergo a change, the feedback control of the welding current enables the detection resistance value detected by the resistance detection means to approximate to a model resistance value, thereby stabilizing and optimizing the temperature increase of the joint.

Further, the rate at which the current is increased is kept low, and therefore a sharp temperature increase is prevented, thereby preventing an overheat.

Furthermore, a model starting point is selected from the resistance value for the first cycle and compared with a proper model thereby to prevent an increase in heat quantity.

As another advantage, the welding current is stopped on the basis of the ratio Rmc/Rma, and therefore the reliability of the joint condition is improved while at the same time preventing the joint condition from being dependent on the error of the base metal or plate thickness.

A further advantage is that the welding current is limited when the detection resistance value drops from a peak value by a predetermined amount, so that the resistance is decreased along gentle curve thereby to prevent an overheat.

DESCRIPTION OF THE PREFERRED EMBODIMENTS

Now, a resistance welding control system according to the present invention will be explained with reference to an embodiment shown in the accompanying drawings.

Figure 1:
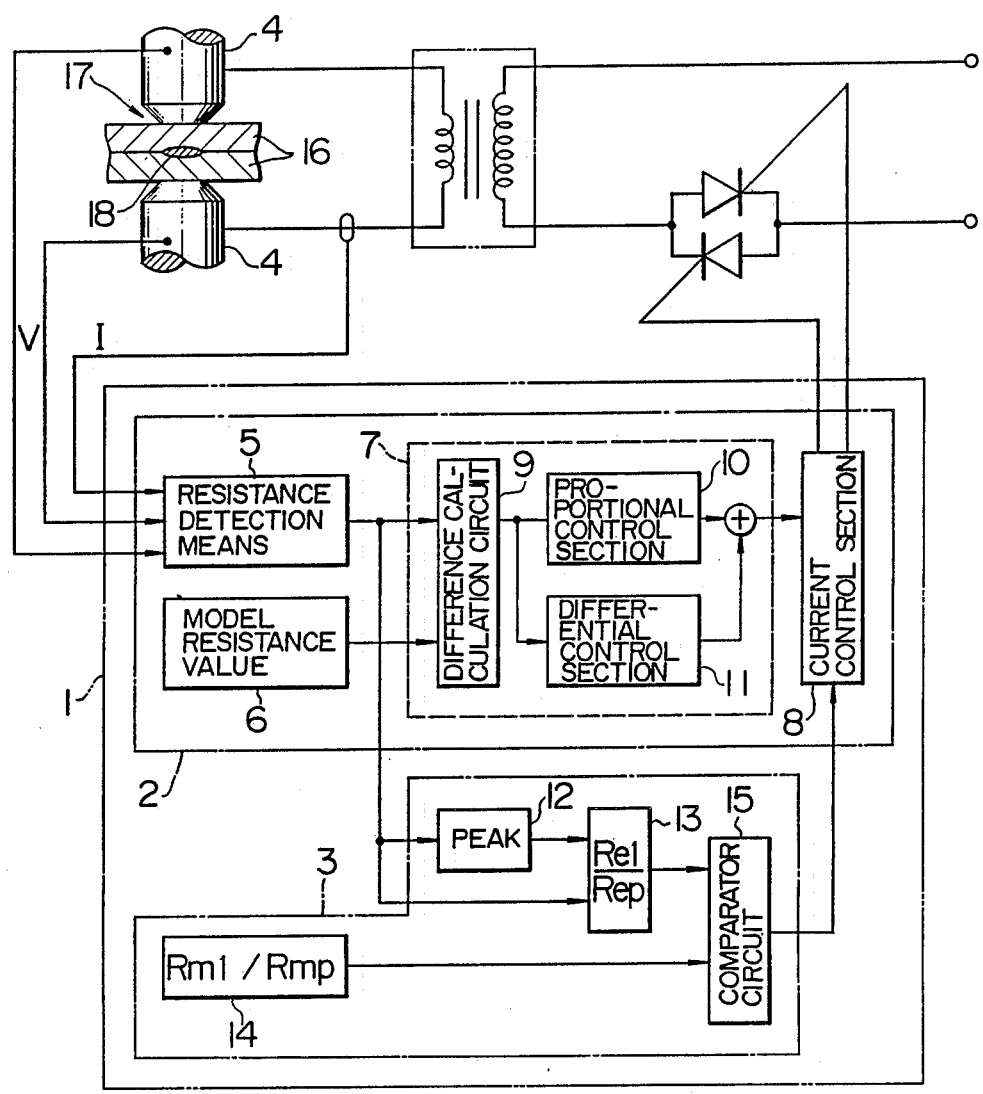
FIG. 1 is a diagram showing a general configuration of a resistance welding control system according to a first embodiment of the present invention.
Figure 2:
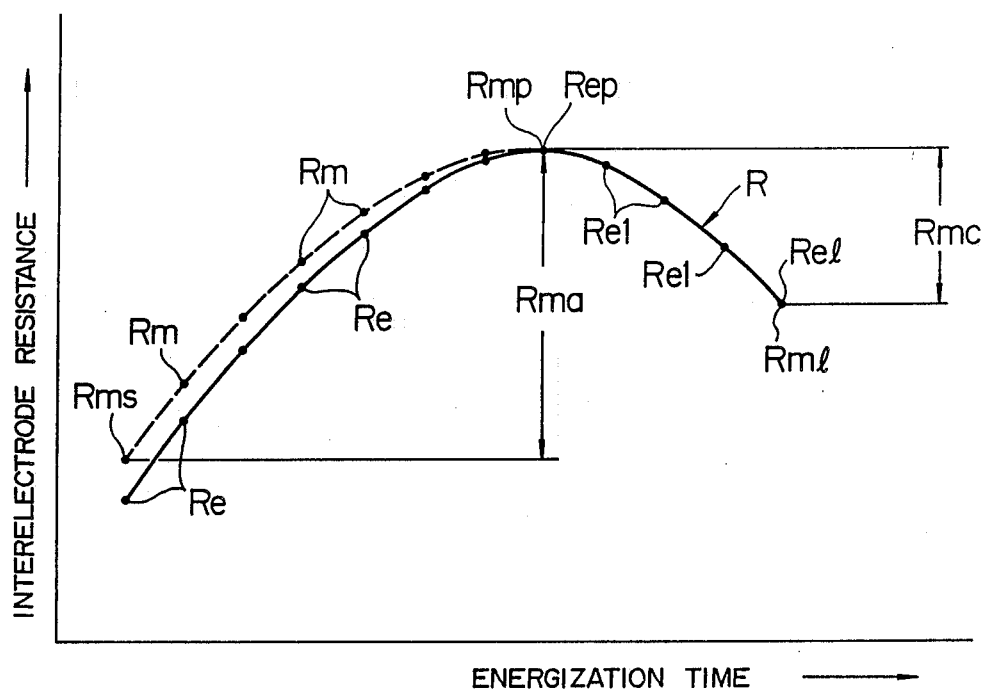
FIG. 2 is a graph showing a behavior of the detection resistance value.

FIG. 1 is a diagram showing a general configuration of a resistance welding control system 1 for controlling the spot welding process, and FIG. 2 a graph showing the behavior of a detection resistance value.

The resistance welding control system (hereinafter called "the control system") according to this embodiment comprises a resistance pattern tracking control section 2 for detecting an interelectrode resistance R in welding operation at each energization cycle (1/60 second) and causing a detection resistance value Re to follow a predetermined curve of the model resistance value Rm (described later), and an energization control section 3 for determining a de-energization time in order to control the energization time. One energization cycle period as selected, for example, 1/60 sec when the welding current is an AC current of 60 Hz. However, the one cycle period is not limited to this value, but may be any selected value.

The resistance pattern tracking control section 2 includes resistance detection means 5 for detecting an interelectrode resistance R by measuring a voltage V applied between electrodes 4 and a welding current I, a model resistance value memory section 6 for storing a predetermined model resistance value Rm, a compensation control section 7 for determining a compensation amount of the welding current, and a current control section 8 for controlling a welding current I in accordance with the compensation amount thus determined.

The compensation control section 7, on the other hand, includes a difference calculation circuit 9 for calculating the difference between the resistance value Re detected by the resistance detection means 5 and the model resistance value Rm for each cycle, a proportional control section 10 for calculating a compensation amount in accordance with the difference determined by the difference calculation circuit 9 and a differential control section 11.

The energization control section 3 includes a peak hold section 12 for storing a peak value Rep of the detection resistance value Re, an Rel/Rep calculation circuit 13 for calculating the value Rel/Rep for each cycle based on the peak value Rep and a detection resistance value Rel detected after appearance of the peak value Rep, an Rml/Rmd memory section 14 for storing a first proper value Rml/Rmp (described later) set in advance, and a comparator circuit 15 for comparing the value Rel/Rep determined by the Rel/Rep calculation circuit 13 with the proper value Rml/Rmp and applying a de-energization signal to the current control section 8 for de-energizing the operation when Rel/Rep reaches Rml/Rmp.

The model resistance value Rm will be explained below with reference to FIGS. 3 and 4.

The interelectrode resistance R under a constant current supplied between the electrodes 4 is expressed as $$R = \rho \cdot L/Sn \, [\mu\Omega]$$

where $\rho \cdot L/Sn \, [\mu\Omega cm]$ is a specific resistance of a material to be welded or a base metal 16, $Sn[cm^2]$ a nugget area, and $L[cm]$ the thickness of the weld zone.

In the case where the constant current is supplied between the electrodes 4, therefore, the temperature $\theta$ of a joint 17 increases with time, and the specific resistance $\rho$ increases accordingly thereby to increase the interelectrode resistance R.

With a further increase in the temperature $\theta$ of the joint 17, assume that the base metal 16 reaches a temperature higher than a melting point. A nugget 18 is formed on the joint 17, and about that time, the interelectrode resistance R indicates a peak value Rmp as shown in FIG. 4.

With the growth of the nugget 18 with time, the nugget area Sn increases and the interelectrode resistance R gradually decreases from the peak value Rmp.

Figure 4:
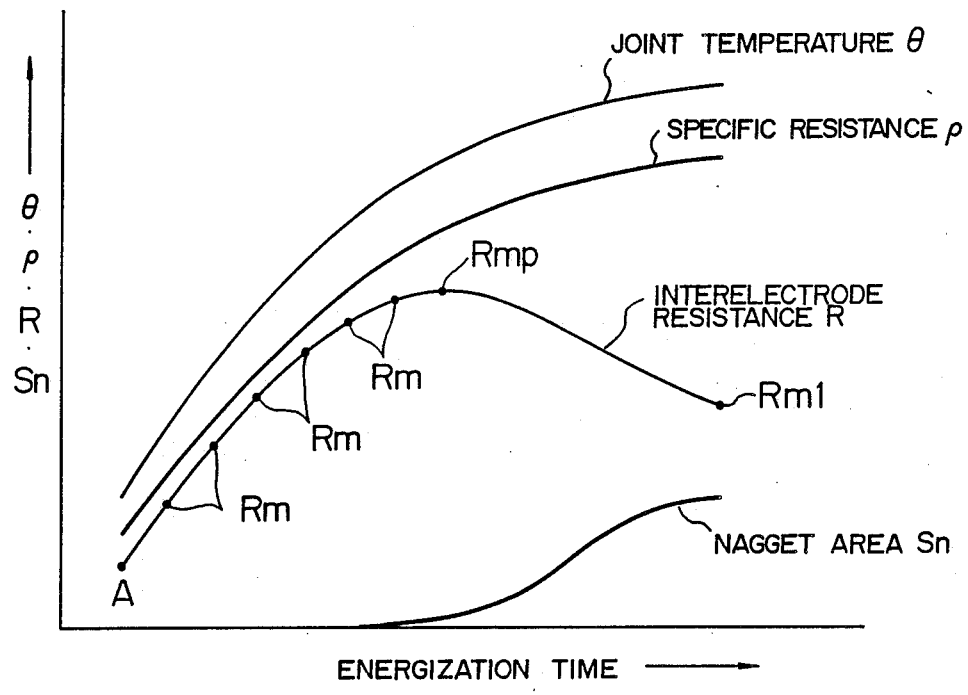
FIG. 4 is a graph showing a behavior of the interelectrode resistance.

By following the processes mentioned above, the behavior of the interelectrode resistance r takes a waveform shown in FIG. 4 with the temperature increase of the joint 17.

It would thus be possible to produce a sound joint condition in a stable manner if this waveform is realized in an actual resistance welding operation.

In view of this, according to the present embodiment, the initial rise portion from a base interelectrode resistance A at the first cycle to the peak value Rmp is used as a model pattern, which is determined based on the behavior of the interelectrode resistance R producing a sound joint condition shown in FIG. 4. Such an interelectrode resistance value is set at every cycle of the model pattern as a model resistance value Rm.

Figure 3:
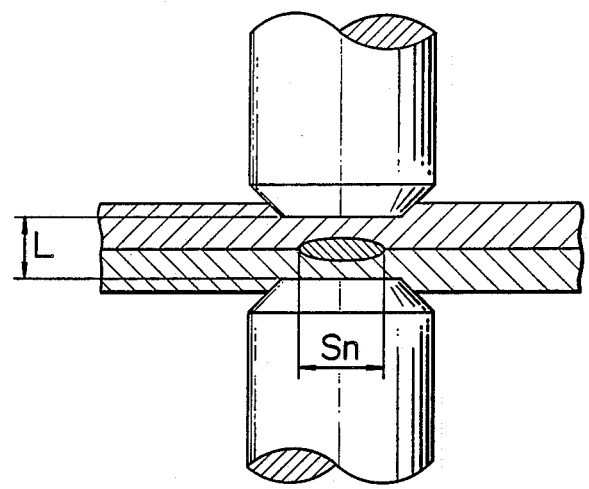
FIG. 3 is a sectional view of a joint.

FIG. 3 is a sectional view of the joint 17, and FIG. 4 a graph showing the behavior of the interelectrode resistance R with time.

Now, a proper value Rml/Rmp set in advance for determining the time of de-energization will be explained.

In the case where the energization is stopped when the interelectrode resistance R decreases by a value ΔR from the maximum resistance value Rmp, the interelectrode resistance value is extremely low or high at the first cycle, for example, due to the effect of the surface condition of the base metal 16, the heat input may become excessively large or small, resulting in generating a welding spark or causing a shortage of strength.

Specifically, external disturbances such as the surface conditions of the base metal 16 and the electrode conditions gives an effect on the rising characteristics of the interelectrode resistance R (variation of the resistance R from its value detected at the first cycle of energization to a peak value) so that the above-mentioned welding failure may be caused if the energization is always interrupted with a predetermined resistance drop of $\Delta R$.

In order to obviate this problem, according to the present embodiment, a proper value of Rml/Rmp is set in advance on the basis of a waveform of the interelectrode resistance R involving a sound joint condition, and this value Rml/Rmp is stored in a memory 14, where Rmp designates a peak value of the interelectrode resistance R and Rml an interelectrode resistance at the time of de-energization.

The peak value Rep of the interelectrode resistance R during welding is measured. Using the peak value Rep and a resistance value Rel detected subsequent to appearance of the peak value Rep, the Rel/Rep value is calculated at every cycle, and when Rel/Rep reaches Rml/Rmp, energization is stopped. The resistance value measured at this time point is designated as Rel.

The de-energization is determined based on calculation of the Rel/Rep this way, and therefore, in the case where the heat input is excessively large as mentioned above, the energization is stopped earlier (with a small $\Delta R$) and in the case where the heat input is excessively small, the energization is stopped later (with a larger $\Delta R$) than the case where the energization is stopped when the resistance drop $\Delta R$ reaches a predetermined value.

As a result, when the time of de-energization is determined by calculating Rel/Rep, the reliability of the joint condition is improved as compared with the case where the energization is stopped at a predetermined value of the resistance drop value $\Delta R$.

Figure 5:
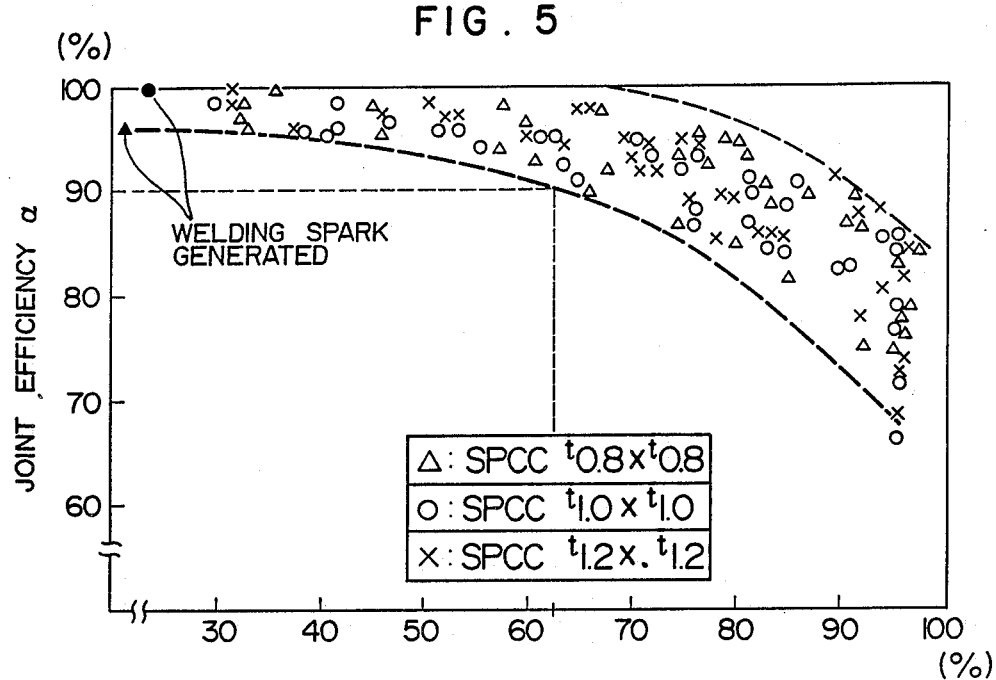
FIG. 5 is a diagram showing the result of an experiment on the joint efficiency with Rel/Rep calculated and energization stopped.
Figure 6:
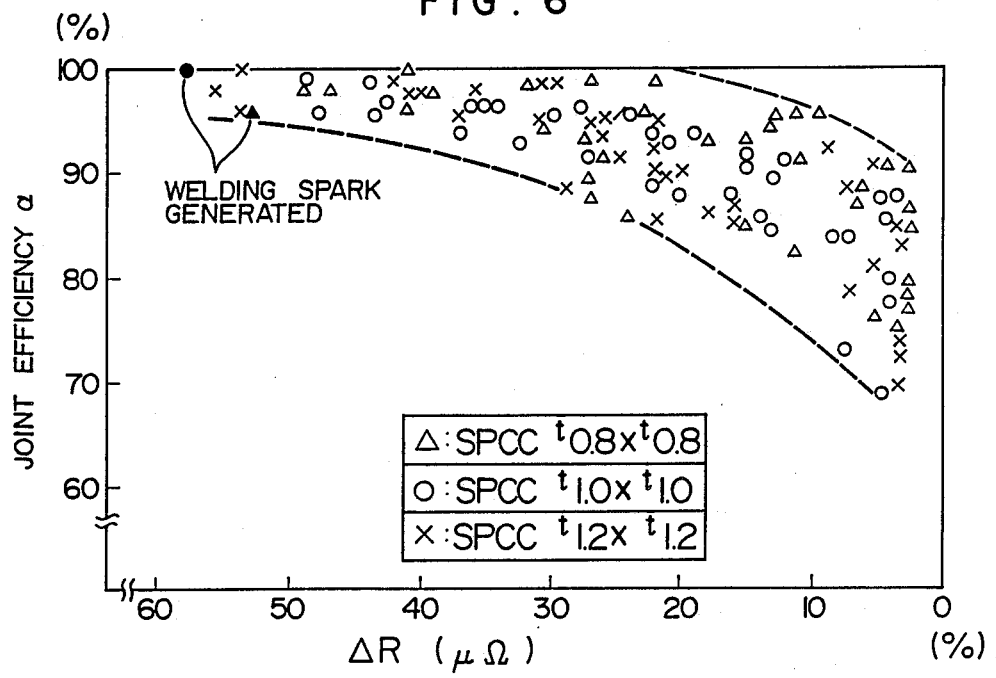
FIG. 6 shows the result of an experiment of the joint efficiency with the energization stopped by a resistance drop value ΔR.

FIGS. 5 and 6 show results of experiments conducted in which the tensile shearing strength at the welded part is represented by the joint efficiency.

A result of experiment in the case where the de-energization is determined based on the calculated Rel/Rep is shown in FIG. 5, where the abscissa represents $(Rep-Rel)/Rep \times 100$, and that in the case where the de-energization is determined based on the detected value of the resistance drop value $\Delta R$ is shown in FIG. 6.

Also, the joint efficiency $\alpha$ is determined from a formula $\alpha$ =(measured value/maximum value of the tensile shearing strength in each experiment)$\times 100\%$.

These results of experiments show that the variations in joint efficiency are smaller with a stabler effect when the de-energization is determined based on calculation of Rel/Rep.

In view of the fact that a welding spark is undesirably generated if the joint efficiency $\alpha$ is increased as shown by black circle and triangle as in FIGS. 5 and 6, and also taking into consideration that the joint efficiency $\alpha$ is to be set to more than 90% according to the present embodiment, the value $(Rep-Rel)/Rep \times 100$ is set to 63%.

Now, the operation of the control system 1 will be explained.

First, an interelectrode resistance R is detected by measuring a welding current I and a voltage V applied between the electrodes 4 by resistance detection means 5. The difference between the detection resistance value Re and a predetermined model resistance value Rm stored in the model resistance value memory 76 is calculated at each cycle.

Subsequently, a compensation amount is calculated by the proportional control section 10 and the differential control section 11 in accordance with the difference determined by the difference calculation circuit 9.

The current control section 8 adjusts the welding current I on the basis of the compensation amount, thus optimizing the temperature increase of the joint 17. The initial behavior of the interelectrode resistance R under welding operation is thus caused to follow the predetermined model pattern.

After that, in order to secure a proper nugget area, the energization control section 3 is operated to stop the energization appropriately.

First, the peak value Rep of the detection resistance value Re is stored by a peak hold section 12, after which the Rel/Rep calculation circuit 13 determines Rel/Rep from the peak value Rep and a resistance value Rel detected subsequent to the detection of the peak value Rep.

Further, the value Rel/Rep thus calculated is compared with the value Rml/Rmp stored in the Rml/Rmp memory 14 at the comparator circuit 15, and when Rel/Rep reaches Rml/Rmp, a de-energization signal for stopping energization is applied to the current control section 8.

The current control section 8 receives this de-energization signal to stop energization, thereby completing the control process.

The aforementioned control operation stabilizes the temperature rise of the joint 17 and secure the proper nugget area, thus providing a sound welding quality in stable manner.

Figure 7:
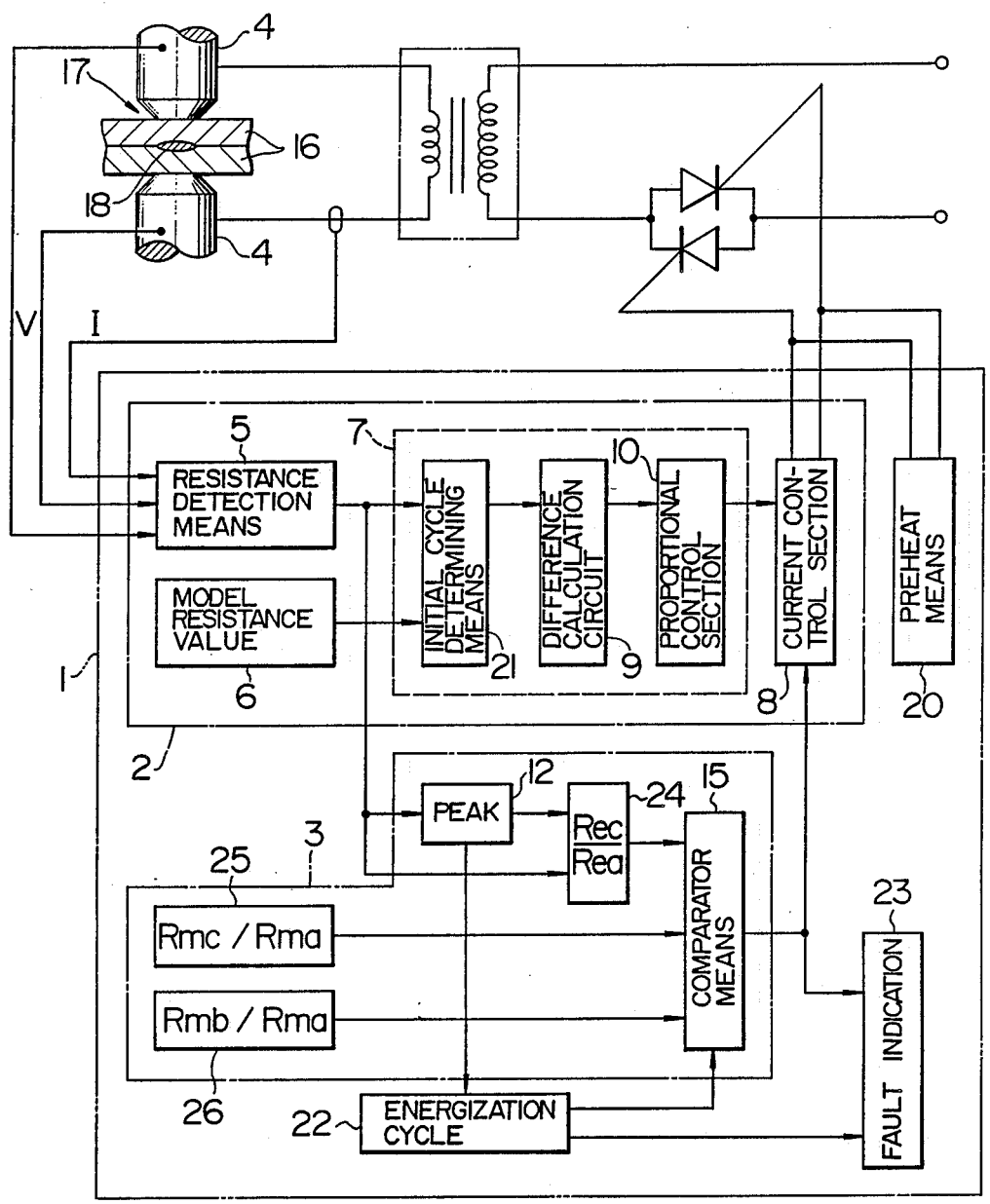
FIG. 7 is a diagram showing a general configuration of a system according to the second embodiment of the invention.
Figure 8:
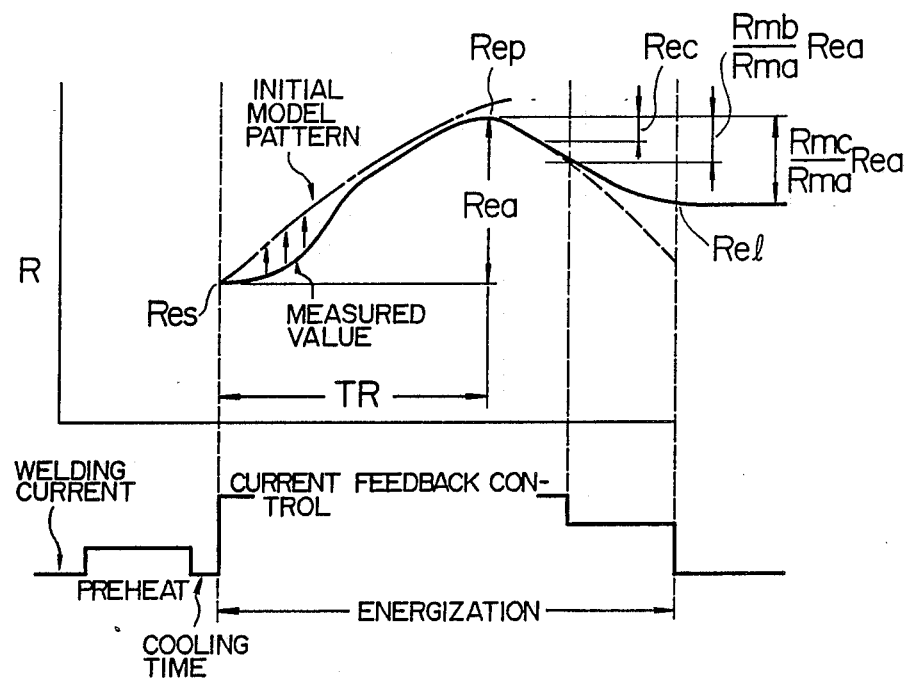
FIG. 8 is a characteristic diagram showing the condition of the detection resistance value and the welding current.

Now, a second embodiment of the control system according to the present invention is shown in FIG. 7. According to this second embodiment, first, preheat means 20 supplies current of 1000 to 1500 (A) during 5 to 10 cycles as shown in FIG. 8 in the case where the thickness of the base metal 16 is 1 mm. As a result, a portion between the base metals 16 is heated for stable contact resistance. After that, the interelectrode resistance R is detected by the resistance detection means 5.

In the process, in the case of FIG. 8, a cooling time is provided to stop the energization during the period from preheating to the resistance detection by the resistance detection means 5. This cooling time is provided for preventing the base metals which may be circular in section with a small contact area therebetween from being increased too much in temperature by an excessive current flow during the preheating.

After this, a model starting point is determined by initial cycle determining means 21. The reason why this model starting point is determined will be explained with reference to FIGS. 9 to 11.

Figure 9:
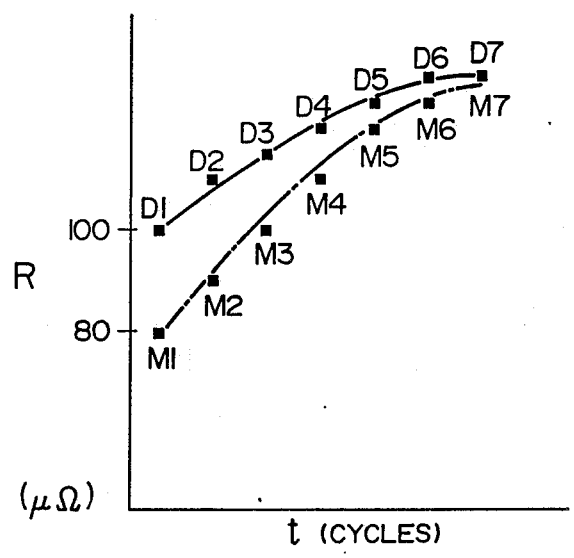
FIG. 9 is a characteristic diagram showing a proper model resistance value and a standard resistance value associated with a fault.

According to the first embodiment mentioned above, in order to stabilize the temperature rise of the weld zone, the initial resistance pattern between electrodes for proper welding conditions is controlled to follow a model pattern $M_1$ to $M_7$ by current control, as shown in FIG. 9. In the case where the deformation and surface condition of the base metal or the pressure tracking ability of the electrodes 4 undergo a considerable change, however, the interelectrode resistance at the first cycle may be increased as shown by $D_1$ in FIG. 9. The pattern $D_1$ to $D_7$ is shown as a typical standard obtained when a predetermined current is supplied without any current control unlike in the first embodiment.

Figure 10:
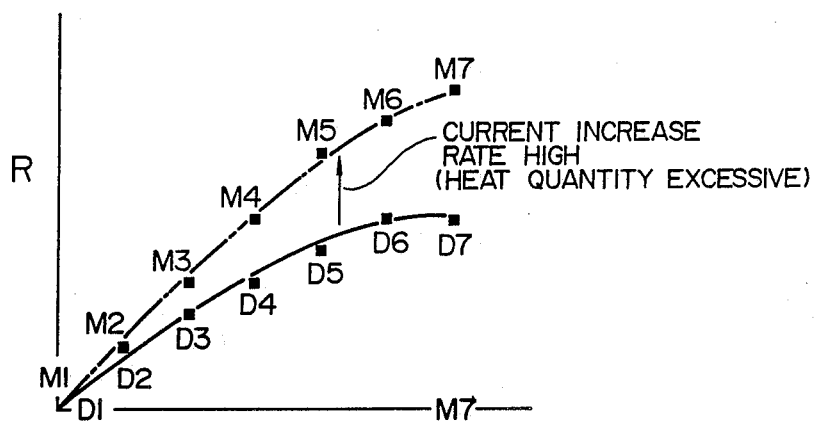
FIG. 10 is a characteristic diagram showing the condition in which the initial values of the resistance values in FIG. 9 are rendered to coincide with each other.

If the current is controlled as in the first embodiment, by contrast, it causes the interelectrode resistance to follow the model pattern $M_1$ to $M_7$ with its starting point Ml coinciding with $D_1$ as shown in FIG. 10, resulting in a substantial difference between the pattern $D_1$ to $D_7$ and the model pattern, which in turn causes the current to be increased considerably. With the increase in current, the heat quantity is also increased and the resultant overheating (or a welding spark) would reduce the strength.

In order to prevent this inconvenience, the resistance $D_1$ measured at the first cycle is compared with the absolute value $M_1$ of the predetermined model of resistance value at the first cycle, and select a model starting point in a manner mentioned below.

Model starting point = α + 1 where α = {(Measurement $D_1$/Model value $M_1$) − 1} × 10 (decimals omitted). If $D_1$ is 100 μΩ and $M_1$ is 80 μΩ, for example, the model starting point is set to the third cycle.

Figure 11:
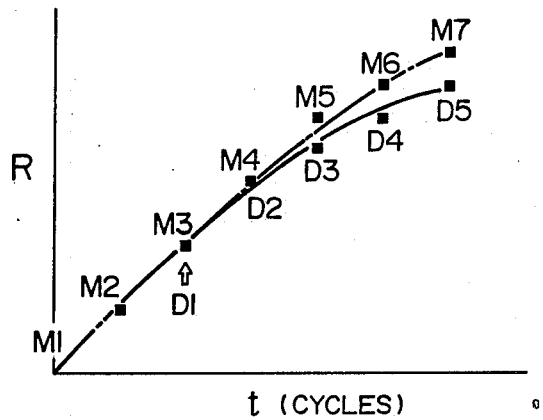
FIG. 11 is a characteristic diagram showing the condition in which the initial values of the resistance value associated with a fault in FIG. 9 is rendered to coincide with $M_3$.
Figure 12:
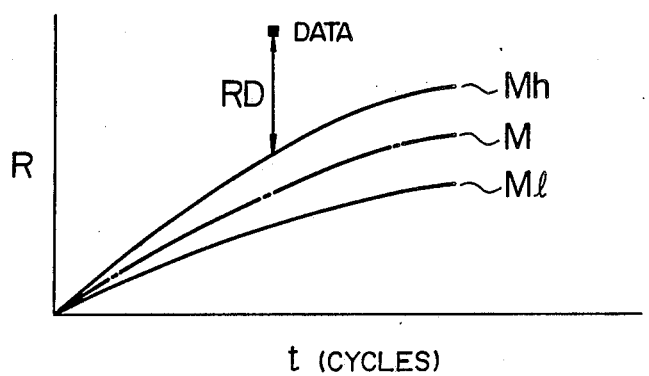
FIG. 12 is a characteristic diagram showing a model resistance value.
Figure 13:
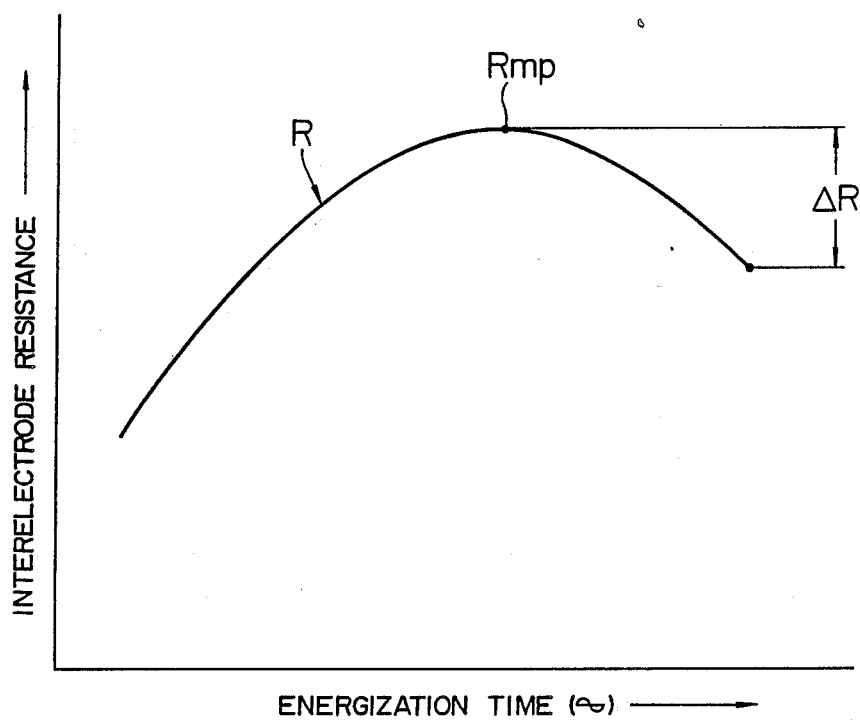
FIG. 13 is a graph showing a behavior of the interelectrode resistance for explaining the prior art.

Specifically, as shown in FIG. 11, the resistance value $D_1$ measured at the first cycle is rendered to coincide with the model resistance value $M_3$ at the third cycle. As a result, the control is carried out so that the measured resistance values $D_1$ to $D_5$ substantially coincide with the values $M_3$ to $M_7$ of the model pattern, thereby eliminating the problems of overheating, etc.

After determining a model starting point, the difference between the detection resistance value and the model resistance value is calculated by a difference calculation circuit 9 as in the first embodiment. As the model resistance value, an upper limit model value Mh and a lower limit model value Ml and set with ±5% allowances from an optimum model value M.

In the case where a detection resistance value is higher than the upper limit model value, the welding current is reduced according to Table 1 below.

TABLE 1

| $R_D$ | Current reduction |
|---|---|
| 1 to 10 (μΩ) | 5.0% down |
| 11 to 20 (μΩ) | 7.5% down |
| 21 to 40 (μΩ) | 10.0% down |
| 41 (μΩ) or more | 12.5% down |

When a detection resistance value is lower than the lower limit model value, on the other hand, the welding current is increased according to Table 2 below.

TABLE 2

| $R_D$ | Current reduction |
|---|---|
| 1 to 10 (μΩ) | 2.5% down |
| 11 to 20 (μΩ) | 5.0% down |
| 21 to 40 (μΩ) | 7.5% down |

Current is controlled in different amounts in Tables 1 and 2 above by reason of the fact that an overheat (or welding spatter) forms a serious welding defect in the resistance welding process. The amount of current increase, therefore, is limited in such a manner as to prevent a sharp temperature increase, while the amount of current reduction is increased due to a low thermal response of the weld zone thereby to prevent an overheated condition (or welding spatter).

According to the present method of control, the energization time tends to lengthen. Nevertheless, this poses no problem as experiments show that a satisfactory result is obtained if the energization time is 10 to 25 cycles for the metal thickness of about 1.2 mm.

The welding current is controlled in such a way that the detection resistance takes a value between the upper limit model value Mh and the lower limit model value Ml.

The energization control section 3 will be explained. According to the second embodiment under consideration, the peak hold section 12 detects a peak value Rep of the detection resistance value, followed by the difference Rea between the value Rep and the detection resistance value Res at the first cycle shown in FIG. 8. The Rec/Rea calculation circuit 24 fetches the value Rec which is the peak value Rep less a predetermined value at each cycle thereby to calculate the value Rec/Rea at each cycle.

The Rmc/Rma memory section 25, on the other hand, stores a first proper value Rmc/Rma according to a model pattern shown in FIG. 2, where Rma is the difference between the initial value Rms and the peak value Rmp, and Rmc the difference between the peak value Rmp and the interelectrode resistance value Rml with energization stopped.

When the value Rec/Rea calculated at each cycle reaches the first proper value Rmc/Rma, the energization is stopped.

Specifically, unlike the first embodiment in which the energization is stopped by measuring an absolute value (peak value Rep and the value Rel for de-energization), the second embodiment is such that relative values (differences Rea and Rec) are calculated to stop energization, so that even if the thickness of the base metal 16 undergoes a small variation leading to a changing detection resistance value, the energization is always accurately stopped, thereby producing a satisfactory joint condition.

According to the present embodiment, the resistance value is detected at each cycle, and therefore, even if energization is stopped when the calculated value Rec/Rea reaches the first proper value Rmc/Rma, a sharp power reduction (in two to four cycles) may form excessive nuggets before complete de-energization, often causing an overheat (or welding spark) due to the surface conditions of the base metal 16 or the pressure tracking ability or other disturbances.

In order to obviate this problem, according to this embodiment, a predetermined second proper value Rmb/Rma is stored in the memory section 26, and when the value Rec/Rea reaches the second proper value Rmb/Rma as shown in FIG. 8, the welding current is limited by a predetermined amount to realize a moderate resistance drop as shown by solid line. As a consequence, a sharp resistance drop is prevented.

It has also been confirmed by our experiments that the earlier the time $T_R$ appears when the resistance value is maximum in FIG. 8, the more sharply the resistance drops (that is, the more an overheated condition tends to be caused).

To meet this situation, the number of energization cycles is detected by an energization cycle detector 22 in response to a signal from the peak hold section 12, and in accordance with the number of cycles before detection of a peak value, the welding current is controlled in the manner shown in Table 3 below.

TABLE 3

| Number of energization cycles | Welding current |
|---|---|
| 2 to 4 | 15% down |
| 5 to 8 | 10% down |
| 9 or more cycles | 5% down |

According to the second embodiment, the energization cycle detector 22 detects the number of cycles, and if this number is more than a predetermined number (say, 30 cycles) before an energization stop, a fault is indicated. This is due to the fact that with the increase in energization cycles, the electrodes 4 would be embedded in the base metals 4 under pressure, with the result that the strength between the base metals 4 is decreased.

In the above-mentioned embodiments, energization is stopped when the ratio Rel/Rep calculated reaches a predetermined value. Unless the behavior of the interelectrode resistance R in welding operation deviates extremely from a model pattern, however, the energization may be stopped with the resistance drop ΔR as in the prior art with the same effect.

Also, according to the embodiments mentioned above, the current is limited when the calculated ratio Rec/Rea reaches the second proper value Rmb/Rma. Instead, the current may be reduced by a predetermined value of resistance drop.

As an alternative way, an energization time from energization start to energization stop or the time length from a peak value to an energization stop may be set. As another alternative, a displacement value of the electrodes which is said to have a correlationship with the nugget formation, the value of change in transmission of ultrasonic wave or the value of change in acoustic emission may be set appropriately in advance, and the energization may be stopped in accordance with the set value.

Instead of setting a model starting point by the initial cycle determining means 21 as in the aforementioned second embodiment, several model patterns may be stored out of which a model pattern most proximate to the measured resistance value for the first cycle may be selected.

According to the embodiment under consideration, the current control section 8 employs a thyristor control by an AC waveform. It is, however, of course possible to realize the same effect by a DC waveform using a DC power supply or by transistor control. In such a case, a predetermined time sufficiently short to assure the controllability is secured as a cycle of interelectrode resistance detection.

Unlike in the present embodiment using the resistance welding control system 1 for controlling the spot welding process, it may be applied with equal effect to the projection welding, but welding or other resistance welding processes as well.

We claims:

1. A resistance welding control system comprising:
   resistance detection means for detecting an interelectrode resistance by measuring a welding current and a voltage applied between electrodes;
   compensation means for comparing a detected resistance value detected by said resistance detection means with a predetermined model resistance value and determining an amount of compensation of the welding current in accordance with a difference between the detected resistance value and the model resistance value; and
   current control means for controlling an amount of said welding current on the basis of said amount of compensation determined by the compensation means, wherein said compensation means operates such that a first rate at which the welding current is reduced when the detection resistance value is higher than the model resistance value is higher than a second rate at which the welding current is increased when the detection resistance value is lower than the model resistance value.

2. A resistance welding control system according to claim 1, further comprising:
   peak hold means for detecting a substantial peak value Rep of the detection resistance value; and
   energization control means for stopping a supply of the welding current when the detected resistance value decreases by a predetermined amount ΔR below the peak value Rep.

3. A resistance welding control system according to claim 2, wherein said energization control means includes Rm1/Rmp memory means for storing a ratio Rm1/Rmp where Rmp is a peak value and Rm1 is a value that is a predetermined amount lower than the peak value Rmp, based on a waveform of the interelectrode resistance R involving a sound joint condition, the welding current being stopped when a ratio between a resistance value Rel and Rep reaches Rm1/Rmp, where Rel is a detection resistance value lower than Rep, and Rep is the peak value.

4. A control system of a resistance welding apparatus for welding base metals held between electrodes, comprising:
   resistance detection means for detecting an interelectrode resistance at each energization cycle by measuring a welding current and a voltage applied between the electrodes;
   compensation means for comparing a detection resistance value detected by the resistance detection means with a predetermined model resistance value and determining an amount of compensation of the welding current for the next cycle in accordance with the difference between the detection resistance value and the model resistance value;
   current control means for controlling the welding current on the basis of the amount of compensation of the compensation means; and
   preheat means for supplying a predetermined current between the electrodes thereby to heat the base metals and stabilize the interelectrode resistance before detecting the interelectrode resistance.

5. A system according to claim 4, further comprising means for cooling the base metals for a given period after supplying the predetermined current from the preheat means.

6. A control system of a resistance welding apparatus for welding base metals held between electrodes, comprising:
   resistance detection means for detecting an interelectrode resistance at each energization cycle by measuring a welding current and a voltage applied between the electrodes;
   compensation means for comparing a detection resistance value detected by the resistance detection means with a predetermined model resistance value and determining an amount of compensation of the welding current for the next cycle in accordance with the difference between the detection resistance value and the model resistance value wherein said amount of compensation is detected while using the resistance value detected at the first cycle by said resistance detection means as a resistance value at a given cycle when the model resistance value is approximate to said detected resistance value;

means for changing the model resistance value of the compensation means in response to the magnitude of an interelectrode resistance detected in first cycle by the resistance detection means; and current control means for controlling the welding current on the basis of the amount of compensation of the compensation means.

7. A system as in claim 6, wherein the model resistance value determining means including means for detecting a cycle in which a model resistance value was changed approximate to the resistance value detected in the first cycle by the resistance detection means and for changing the resistance value detected in the first cycle to be substantially consistent with the model resistance value in the detected cycle.

8. A control system of a resistance welding apparatus for welding base metals held between electrodes, comprising:

resistance detection means for detecting an interelectrode resistance at each energization cycle by measuring a welding current and a voltage applied between the electrodes;

compensation means for comparing a detection resistance value detected by the resistance detection means with a predetermined model resistance value and determining an amount of compensation of the welding current for the next cycle in accordance with the difference between the detection resistance value and the model resistance value;

current control means for controlling the welding current on the basis of the amount of compensation of the compensation means, and Rmc/Rma memory means for storing a first proper value corresponding to a ratio Rmc/Rma, where Rma is an amount from an initial value to a peak value and Rmc a predetermined value a predetermined amount lower than the peak value based on a waveform of the interelectrode resistance R associated with a satisfactory join condition, peak detection means for detecting an initial value of the detection resistance value and a difference Rea between said detection resistance value and a detection resistance value Res in a first cycle, to a substantial peak value thereof, Rec/Rea calculation means for calculating a value corresponding to a ratio Rec/Rea where Rec is the difference between the peak value and the resistance value detected for each cycle, and energization control means for stopping energization when the calculated ratio Rec/Rea reaches the first proper value Rmc/Rma.

9. A resistance welding control system according to claim 8, further comprising energization control means for reducing the welding current by a predetermined amount when the detection resistance value decreases by a first predetermined amount from the substantial peak value of the detection resistance value and stopping the supply of the welding current when the detection resistance value decreases by a second predetermined amount greater than said first predetermined amount.

10. A control system of a resistance welding apparatus for welding base metals held between electrodes, comprising:

resistance detection means for detecting an interelectrode resistance at each energization cycle by measuring a welding current and a voltage applied between the electrodes;

compensation means for comparing a detection resistance value detected by the resistance detection means with a predetermined model resistance value and determining an amount of compensation of the welding current for the next cycle in accordance with the difference between the detection resistance value and the model resistance value; and current control means for controlling the welding current on the basis of the amount of compensation of the compensation means, energization control means for reducing the welding current by a predetermined amount when the detection resistance value decreases by a first predetermined amount from the substantial peak value of the detection resistance value and stopping the supply of the welding current when the detection resistance value decreases by a second predetermined amount greater than said first predetermined amount, and number-of-cycles detection means for detecting a number of cycles before the detection resistance value reaches a peak value, the welding current being reduced in an amount progressively greater with the decrease in the number of cycles.

11. A resistance welding control system according to claim 10, further comprising means for issuing an alarm when a number of cycles from the first cycle to a cycle associated with an energization stop is larger than a predetermined value.

12. A control system of a resistance welding apparatus for welding base metals held between electrodes, comprising:

resistance detection means for detection an interelectrode resistance at each energization cycle by measuring a welding current and a voltage applied between the electrode;

compensation means for comparing a detection resistance value detected by the resistance detection means with a predetermined model resistance value and determining an amount of compensation of the welding current for the next cycle in accordance with the difference between the detection resistance value and the model resistance value; and current control means for controlling the welding current on the basis of the amount of compensation of the compensation means, wherein said model resistance value includes a model upper limit and a model lower limit with a predetermined margin from a proper model resistance value therebetween, said compensation means being such that a rate at which the welding current is reduced when the detection resistance value is higher than said model upper value is higher than a rate at which the welding current is increased when said detection resistance value is lower than said model lower limit value, said rates being progressively greater with the increase in the difference between the detection resistance value and selected one of the model lower limit value and the model upper limit value.

* * * * *